(12) United States Patent
Heraud et al.

(10) Patent No.: US 9,090,832 B2
(45) Date of Patent: Jul. 28, 2015

(54) INJECTION OF ADDITIVE INTO A UNIT FOR SYNTHESISING HYDROCARBONS STARTING FROM SYNTHESIS GAS ENABLING A HOMOGENOUS CONCENTRATION OF CATALYST TO BE CONTROLLED AND MAINTAINED

(71) Applicants: ENI S.p.A., Rome (IT); IFP Energies Nouvelles, Rueil-Malmaison Cedex (FR)

(72) Inventors: Jean Philippe Heraud, Saint Pierre de Chandieu (FR); Ann Forret, Longes (FR); Jeremy Gazarian, Condrieu (FR); Marie Claire Marion, Vernaison (FR); Vincent Lecocq, Orlienas (FR); Sebastien Boucher, Chatou (FR); Chiara Della Torre, Milan (IT); Elsa Mignone, Monza (IT)

(73) Assignees: ENI S.P.A., Roma (IT); IFP ENERGIES NOUVELLES, Rueil-Malmaison Cedex (FR)

( * ) Notice: Subject to any disclaimer, the term of this patent is extended or adjusted under 35 U.S.C. 154(b) by 0 days.

(21) Appl. No.: 14/096,064

(22) Filed: Dec. 4, 2013

(65) Prior Publication Data

US 2014/0155500 A1 Jun. 5, 2014

(30) Foreign Application Priority Data

Dec. 5, 2012 (FR) .................................... 12 03302

(51) Int. Cl.
*C10G 2/00* (2006.01)
*B01J 8/22* (2006.01)

(52) U.S. Cl.
CPC . *C10G 2/344* (2013.01); *B01J 8/22* (2013.01); *C10G 2/342* (2013.01);

(Continued)

(58) Field of Classification Search
CPC .................. C10G 2/344; C10G 2/342; C10G 2300/4012; C10G 2300/4081; B01J 8/22; B01J 2208/00539; B01J 2219/00231; B01J 2219/0022; B01J 2219/0025; B01J 2219/002; B01J 2219/00213
USPC ......................................................... 518/700
See application file for complete search history.

(56) References Cited

U.S. PATENT DOCUMENTS

| 3,498,908 A | 3/1970 | Frankovich |
| 4,396,495 A | 8/1983 | Braun et al. |

(Continued)

FOREIGN PATENT DOCUMENTS

| EP | 2199369 A1 | 6/2010 |
| EP | 2348092 A1 | 7/2011 |

OTHER PUBLICATIONS

Search Report dated Aug. 7, 2013 issued in corresponding FR 1203302 application (pp. 1-3).

(Continued)

*Primary Examiner* — Jafar Parsa
*Assistant Examiner* — Amy C Bonaparte
(74) *Attorney, Agent, or Firm* — Miller, White, Zelano, Branigan, P.C.

(57) ABSTRACT

The invention relates to a process for synthesising hydrocarbons starting from a feedstock containing synthesis gas. In the process a solid Fischer-Tropsch catalyst is employed in a three-phase reaction section operated so that the catalyst is maintained in suspension in a liquid phase by the circulation of a gaseous phase from the bottom to the top of the reaction section. The process utilizes conditions to control and maintain the homogeneity of the concentration of catalyst particles in the reaction section.

16 Claims, 1 Drawing Sheet

(52) U.S. Cl.
CPC .. *B01J 2208/00539* (2013.01); *B01J 2219/002* (2013.01); *B01J 2219/0022* (2013.01); *B01J 2219/0025* (2013.01); *B01J 2219/00213* (2013.01); *B01J 2219/00231* (2013.01); *C10G 2300/4012* (2013.01); *C10G 2300/4081* (2013.01)

(56) References Cited

U.S. PATENT DOCUMENTS

| | | | | |
|---|---|---|---|---|
| 5,252,613 | A | * | 10/1993 | Chang et al. ............ 518/700 |
| 5,660,977 | A | | 8/1997 | Flores-Cotera et al. |
| 5,922,191 | A | | 7/1999 | Mata et al. |
| 8,479,572 | B2 | | 7/2013 | Onishi et al. |
| 2010/0242594 | A1 | | 9/2010 | Onishi et al. |
| 2011/0174690 | A1 | | 7/2011 | Canelon et al. |
| 2013/0130033 | A1 | | 5/2013 | Canelon et al. |
| 2013/0143735 | A1 | | 6/2013 | Canelon et al. |

OTHER PUBLICATIONS

M.F. Abid et al., "Hydrodynamic Characteristics Effect of Foam Control in Multiphase Column", XP055074272—Internet—URL:http://www.uotechnology.edu.iq/dep-chem-eng/PAPERS/mohamed%20fade1%20%20x.pdf (May 23, 2011).

L.Z. Pino et al., "Effect of Operating Conditions on Gas Holdup in Slurry Bubble Columns with a Foaming Liquid", Chemical Engineering Communications, vol. 117, No. 1 (1992) pp. 367-382.

* cited by examiner

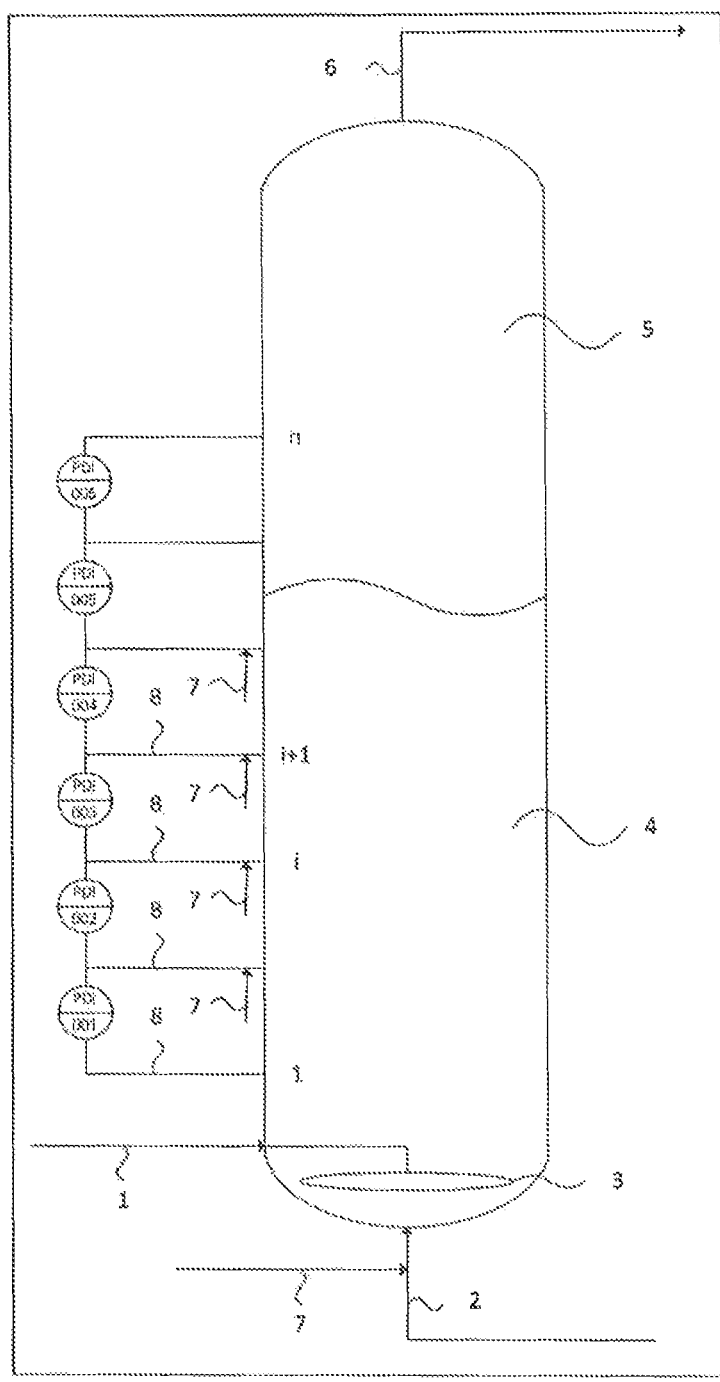

INJECTION OF ADDITIVE INTO A UNIT FOR SYNTHESISING HYDROCARBONS STARTING FROM SYNTHESIS GAS ENABLING A HOMOGENOUS CONCENTRATION OF CATALYST TO BE CONTROLLED AND MAINTAINED

TECHNICAL FIELD OF THE INVENTION

The present invention relates to the field of synthesising hydrocarbons from a feedstock containing carbon monoxide (CO), hydrogen ($H_2$) and possibly carbon dioxide ($CO_2$), hereinafter called synthesis gas.

The process according to the invention enables the functioning of a unit for synthesising hydrocarbons starting from synthesis gas (also called Fischer-Tropsch synthesis) to be optimised, by improving the hydrodynamics of the gas/liquid/solid flow in the reaction section.

PRIOR ART

The Fischer-Tropsch synthesis reaction has been known since the beginning of the $20^{th}$ century. This synthesis produces mainly alkanes, and to a lesser extent alkenes and alcohols, with a very large distribution in the chain length of the hydrocarbons (from $C_1$ to more than $C_{90}$).

The synthesis gas is generally produced from natural gas by autothermal reforming, steam reforming, or partial oxidation. Other sources may enable synthesis gas to be produced, for example vacuum residues, coal, petroleum coke, biomass, and waste products, used individually or in a suitable mixture. A treatment of the synthesis gas is sometimes necessary in order on the one hand to adjust the $H_2$/CO ratio, and on the other hand in order to remove compounds that are harmful to the catalyst employed in the Fischer-Tropsch synthesis, such as for example sulphur-containing and chlorine-containing compounds and metallic carbonyl compounds.

Depending on the origin of the synthesis gas and/or the desired end products, catalysts termed Fischer-Tropsch catalysts are used, whose active phase contains iron or cobalt, which may be associated with metallic promoters in order to improve the selectivity and activity of the catalyst.

The Fischer-Tropsch synthesis is generally carried out at temperatures between 200° C. and 300° C. and at pressures between 1 MPa and 8 MPa, preferably between 2 MPa and 4 MPa.

The Fischer-Tropsch synthesis is employed in a reaction section comprising one or more suitable reactors, whose technology is known to the person skilled in the art. These may for example be multitube fixed-bed reactors, or bubble column reactors, or microstructured reactors with the catalyst deposited in or on the walls of the micro-channels.

Operation in one or more bubble column reactors is the preferred mode of implementation since the synthesis is extremely exothermic, with an enthalpy of reaction of the order of −170 kJ/mol. This type of operation enables, inter alia, the thermal control of the reactor to be improved. This mode of implementation also has the advantage of resulting in only a small loss of feedstock and using small size catalyst granules so as to reduce the limitations on the transfer material into the catalyst granules.

The bubble column type of reactor, known in English by the name "slurry bubble column", is a three-phase reactor in which the finely divided catalyst is suspended in a liquid phase, the two-phase mixture of said catalyst and said liquid phase commonly being called a "slurry", by the circulation of the gaseous phase from the bottom to the top of said reactor, as described for example in the patents U.S. Pat. No. 5,252,613, EP0820806 and EP0823470.

The light products, which are in the gaseous phase under the operating conditions of the reaction section, are separated in a gas/liquid separation section, while the heavier hydrocarbon compounds are separated from the catalyst in a waxes/catalyst separation section, which enables the waxes to be extracted and the catalyst to be recycled to the reaction section so as to maintain the catalyst balance in said section.

Such a separation may be performed by filtration, the filtering elements being arranged in the upper part of the reactor. This filtration technology is described in numerous documents, for example U.S. Pat. No. 5,527,473 or WO 10074761. It may also employ an external waxes separation loop, such as described for example in the patents U.S. Pat. No. 5,770,629 or FR 2 802 828, in which a part of the slurry is removed from the reaction section, next a separation of the phases constituting the slurry is performed in two stages, namely a first degassing stage, followed by a second stage during which said waxes are separated from the catalyst, the catalyst then being recycled to the reaction section by means of a recirculation line of the slurry phase.

The Fischer-Tropsch catalyst is very finely divided into particles typically having a mean size of the order of 5 microns to 500 microns, this size corresponding to the diameter of the smallest sphere surrounding the particle. The concentration of solid particles of Fischer-Tropsch catalyst in the suspension is between 10% and 65% of the total weight of said suspension.

Thanks to the vigorous recirculation of the liquid in the reactor, the bubble column type reactor enables a homogenous concentration of particles of Fischer-Tropsch catalyst to be obtained within the reaction section, thereby reducing the limitations on the transfer of material from the exterior to the interior of the catalyst grains.

However, depending on the operating conditions and the catalyst used for the Fischer-Tropsch synthesis, a concentration gradient of catalyst particles may be observed along the longitudinal axis of the reactor. This concentration gradient is also accompanied by a variation in the amount of gas along said axis, the amount of gas representing the volume percentage of gas in a given volume of gas/liquid/solid three-phase medium. This loss of homogeneity of the solid phase and of the gaseous phase in a bubble column is due to perturbations of the hydrodynamics of the gas/liquid flow in the reaction section. This concentration gradient of catalyst particles within the reaction section leads to a deterioration in the performances of the process, significantly reducing the liquid productivity, increasing the productivity of light compounds (methane, ethane, etc), which are products of low added value, and reducing the service life of the catalyst, resulting in a more rapid renewal of the contents of the reactor and consequently increased operating costs.

U.S. Pat. No. 4,969,988 describes a process for hydrocracking heavy petroleum fractions in a vertical bubble column in which foam-forming conditions are observed. An anti-foaming compound dissolved in a solvent is injected into a region comprised in the upper three tenths of the column. This document discloses that no significant effect on the foam formation is observed when the anti-foaming agent is injected together with the feedstock or into the lower part of the reactor for the hydrocracking processes of heavy fractions.

U.S. Pat. No. 4,396,495 describes the improvement in the performances of a hydrotreatment process of hydrocarbon "heavy oils" containing asphaltenes and metals by injecting a silicone-type antifoaming agent, the losses in performance being due to the foam formation.

US patent application US2010/0242594 teaches the use of information obtained from several pressure measurements, one of which is taken below the liquid level, so as to measure the liquid level in the reaction section.

However, none of these documents employs a process for controlling the homogeneity of the catalyst concentration in the reaction section nor a device for maintaining a homogeneous concentration of catalyst in said reaction section.

Thus, the loss of production of high added value liquid compounds and the risks of deactivation of the Fischer-Tropsch catalyst have led the applicant to search for a method to maintain a homogenous catalyst concentration in the bubble column reactor or reactors contained in said reaction section.

OBJECT AND IMPORTANCE OF THE INVENTION

The object of the present invention is a process for synthesising hydrocarbons starting from a feedstock containing synthesis gas, in which a solid Fischer-Tropsch catalyst is employed in a three-phase reaction section operated so that said catalyst is maintained in suspension in a liquid phase by the circulation of a gaseous phase from the bottom to the top of said reaction section, characterised in that the following stages are carried out so as to control and maintain the homogeneity of the concentration of catalyst particles in the reaction section:
  (a) for all i between 1 and n−1, n representing the number of pressure measuring points disposed along the longitudinal axis of the reactor and being at least equal to 3, the differential pressures $\Delta P_i$ between two consecutive pressure measuring points spaced apart by $\Delta h_i$ are measured and the pressure drops per meter $\Delta G_i = \Delta P_i / \Delta h_i$ are calculated,
  (b) for each loss of feedstock per meter in said catalyst suspension in the liquid phase $\Delta G_j$, a value is calculated corresponding to the difference between two consecutive pressure drops per meter divided by their mean $(\Delta G_{j+1} - \Delta G_j)/((\Delta G_{j+1} + \Delta G_j)/2)$,
  (c) if at least one of the values calculated in the stage (b) is not less than 20%, at least one additive comprising at least one organosilicon polymer is injected at least at the bottom of said reaction section.

An object of the present invention is to control the homogeneity of the catalyst concentration in the reaction section and to maintain a homogenous catalyst concentration profile along the longitudinal axis of the reactor by injecting a suitable additive.

The advantages of the present invention reside in the fact that a control of the catalyst concentration in the reaction section enables the amount of additive to be minimised that has to be injected in order to improve the homogeneity of the catalyst concentration in the reactor or reactors contained in said section and maintain the amount of gas in the reaction section. This invention also has the advantage of maintaining the catalytic performances of the Fischer-Tropsch synthesis, thereby reducing the additions of fresh catalyst and maintaining the production of liquid hydrocarbons having a high added value.

DETAILED DESCRIPTION OF THE INVENTION

The homogeneity of the concentration of catalyst particles in the reaction section is controlled by carrying out several differential pressure measurements along the longitudinal axis of the reactor. The expression differential pressure measurement is understood to mean the measurement of the pressure difference between two pressure measurement points.

The pressure measurements are performed at least once, advantageously at regular time intervals, and preferably continuously. The time interval between two pressure measurements is unique to each installation, as well as to its mode of operation, and is determined by the person skilled in the art and the available technology. This interval may for example be 5 s, 1 min, or 1 h.

The differential pressure $\Delta P_i$ is related to the height difference $\Delta h_i = h_{i+1} - h_i$ between two consecutive pressure measurement points, to the acceleration due to gravity g and to the mean volumetric mass of the reaction phase $\rho_i$ between said two pressure measurement points by the following equation (1):

$$\Delta P_i = \rho_i \times g \times \Delta h_i \qquad (1)$$

i being a natural number between 1 and n−1, n representing the number of pressure measurement points disposed along the longitudinal axis of the reactor and being at least equal to 3, the measurement point 1 being the lowest and the measurement point n being the highest.

The distribution and the number of pressure measurement points along the longitudinal axis of the reactor are such that each distance between two consecutive measurement points $\Delta h_i$ is between 0.5 and 5 m, and preferably between 1 and 3 m.

The homogeneity of the concentration of catalyst particles in the reaction section is controlled by observing the following successive stages:
  (a) for all i between 1 and n−1, the differential pressures $\Delta P_i$ between two consecutive pressure measurement points spaced apart by $\Delta h_i$ are measured and the pressure drops per meter $\Delta G_i = \Delta P_i / \Delta h_i$ are calculated.

The successive pressure drops per meter $\Delta G_i - \Delta G_{i+1}$ are then compared. If there exists a whole number j such that for all k between j and n−1 the value of $\Delta G_k$ is less than 20 mbar/m, this means that the pressure measurement points k and k+1 are situated above the gas/slurry interface. In this case the measurements obtained from the pressure measurement points j to n are excluded from the calculation of the pressure drops per meter and only the pressure drops per meter $\Delta G_1$ to $\Delta G_{j-2}$, called pressure drops per meter in the catalyst suspension in the liquid phase are taken into account, since the measurement points 1 to j−1 are all situated below the gas/slurry interface.

Thus, in order to control and maintain the homogeneity of the concentration of catalyst particles in the reaction section, after the stages (a) and (b) the following successive stages are observed:
  (b) for each pressure drop per meter in said catalyst suspension in the liquid phase $\Delta G_j$, a value is calculated corresponding to the difference between two consecutive pressure drops per meter divided by their mean $(\Delta G_{j+1} - \Delta G_i)/((\Delta G_{j+1} + G_j)/2)$,
  (c) if at least one of the values calculated in the stage (b) is not less than 20%, preferably is not less than 10%, and preferably is not less than 5%, at least one additive comprising at least one organosilicon polymer is injected at least at the bottom of said reaction section.

The stages (a) to (c) are advantageously repeated over the course of time.

In view of the stage (b), it is understood that it is advantageous that at least three pressure measurement points are situated below the gas/slurry interface.

By homogeneous concentration of catalyst particles in the reaction section is meant in the sense of the present invention that each difference between two consecutive losses of feedstock per meter in the catalyst suspension in the liquid phase divided by the mean value of the two values in question $(\Delta G_{j+1} - \Delta G_j)/((\Delta G_{j+1} + \Delta G_j)/2)$ is less than 20%, preferably less than 10% and more preferably less than 5%.

By "control" is meant the monitoring over time and the correction, if necessary, of successive pressure drops per meter. This monitoring over time is directly dependent on the frequency of the pressure measurements. By "maintain" is meant that if the concentration of catalyst particles in the reaction section is homogenous in the sense of the present invention, then the means disclosed in the present invention are applied so that each difference between two consecutive pressure drops per meter in the catalyst suspension in the liquid phase divided by the mean of the two values in question $(\Delta G_{j+1} - \Delta G_j)/((G_{j+1} + \Delta G_j)/2)$ remains less than 20%, preferably less than 10% and more preferably less than 5%.

In accordance with the invention said injected additive contains at least one organosilicon polymer. Preferably said organosilicon polymer is chosen from the family of silicones. Preferably said organosilicon polymer is chosen from siloxane polymers. Preferably said organosilicon polymer is polydimethylsiloxane (PDMS).

Said additive may advantageously be heated so as to reduce its viscosity and thereby facilitate its injection. By "facilitate" is meant that the injection is performed easily by conventional means known to the person skilled in the art (pumps for example).

Said additive may also advantageously be injected mixed with a solvent, the latter having the effect of reducing the viscosity of said additive, thereby facilitating its injection into the reaction section.

Said solvent is chosen from the products of the Fischer-Tropsch synthesis. Preferably the solvent used will be the light fraction of the products obtained from the Fischer-Tropsch synthesis, which are liquid under the conditions in which the additive/solvent mixture is injected. The light fraction is the hydrocarbon fraction in the gaseous phase under the operating conditions of the reaction section that is removed at the head of the reactor and then separated in a gas/liquid separation section. Said fraction typically contains hydrocarbon molecules with from 4 to 30 carbon atoms.

In accordance with the invention said additive is injected at least at the bottom of the reaction section, preferably directly into the slurry phase so as to ensure an optimal dispersion of the additive in the reaction section thanks to the agitation induced by the bubbling of the gaseous phase. Preferably said additive is introduced with direct contact of the slurry phase via the branch lines of the pressure measurement points or via the recirculation line of the slurry phase, and more preferably said additive will be injected into the recirculation line of the slurry phase, in direct contact with said phase.

By "the bottom of said reaction section" is meant the region included in the lower two thirds of the reaction section, preferably the region included in the lower third of the reaction section.

The injection of the additive may advantageously be carried out in the form of a batch-wise injection as soon as the concentration of catalyst particles in the reaction section is no longer homogeneous in the sense of the present invention.

According to another mode of implementation, the injection of the additive may advantageously be made in the form of a continuous injection so as to continuously maintain a homogeneous concentration of catalyst particles in the reaction section.

Whatever the preferred injection mode, said additive is injected at a pressure greater than the operating pressure of the reaction section. This avoids blockage of the injection lines due to an accumulation of catalyst. The injection lines of the additive are advantageously equipped with an inert gas purge system under high pressure, for example nitrogen or products obtained from the Fischer-Tropsch synthesis, said light fraction advantageously also being able to be used as solvent for the dilution of the additive.

The flow rate of said additive is determined experimentally as a function of the operating conditions of the process so as to minimise the amount of additive injected into the reaction section while maintaining the homogeneous concentration of catalyst in the reactor.

Following the injection of the additive to the reaction section, the effect of which appears after a duration of the order of one minute, a new calculation of the pressure drops per meter $\Delta G_i$ is carried out. If each difference between two consecutive pressure drops per meter in the catalyst suspension in the liquid phase divided by the mean value of the two $(\Delta G_{j+1} - \Delta G_j)/((\Delta G_{j+1} + \Delta G_j)/2)$ is less than 20%, preferably less than 10% and more preferably less than 5%, then the flow rate or injected amount of additive is satisfactory.

DESCRIPTION OF THE FIGURE

FIG. 1 illustrates the invention without restricting its scope.

The synthesis gas containing carbon monoxide and hydrogen is fed via a line (1) and a distributor (3) into the lower part of the Fischer-Tropsch slurry bubble column reactor partly filled with at least one hydrocarbon fraction, so as to maintain a Fischer-Tropsch catalyst in suspension thereby forming a slurry (4).

The catalyst is in the form of small particles of diameter between 5 and 500 μm, which reduces the transfer limitations. The slurry (4) is continuously mixed so as to form a homogeneous phase that enables an identical temperature to be obtained at all points of said slurry, to ensure a low pressure drop over the reaction section, and that can continuously renew the balance of the catalyst by discharging catalyst contained in the reaction section and charging with fresh catalyst.

The gas that is formed or that has not reacted during the course of the reaction is separated in the discharge section (5) situated above the level of the slurry in the Fischer-Tropsch reactor, and then leaves said reactor via the line (6).

The additive is injected, if necessary heated and/or if necessary mixed with a solvent, via a line (7). Said line (7) may be connected to the slurry recirculation line (2) and/or to one or more branches of pressure measurement points (8).

The number of branches of pressure measurement points may vary and in any case is not limited to the number of branches shown in FIG. 1. Likewise the location of the additive injection lines (7) is not limited to those represented in FIG. 1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 12/03.302, filed Dec. 5, 2012 are incorporated by reference herein.

EXAMPLES

Under the operating conditions of the Fischer-Tropsch synthesis, carried out in the presence of a cobalt-based catalyst of 80 μm mean diameter at a temperature of 220° C. and at 20 bars, a differential pressure gradient is observed along the longitudinal axis of a slurry bubble column. The four pressure sensors are distributed uniformly, the distance between two consecutive sensors being 1 m. Table 1 summarises the measurements of pressure drops per meter observed experimentally.

TABLE 1

Measurement of the pressure drops per metre along the longitudinal axis of the reactor

| $\Delta G_1$ | [mbar/m] | 58 |
| $\Delta G_2$ | [mbar/m] | 48 |
| $\Delta G_3$ | [mbar/m] | 38 |

All the calculated pressure drops per meter are in the catalyst suspension in the liquid phase. The differences between the consecutive pressure drops per meter in the catalyst suspension in the liquid phase divided by the mean value of the two is then calculated:

$(\Delta G_1 - \Delta G_2)/(\Delta G_1 + \Delta G_2)*2 = 19\%$ $(\Delta G_2 - \Delta G_3)/(\Delta G_2 + \Delta G_3)*2 = 23\%$ In order to maintain a homogeneous catalyst concentration profile in the reactor, an injection of additive into the reactor was carried out. Table 2 summarises the measurements of pressure drops per meter observed experimentally, one minute after the injection.

TABLE 2

Measurement of the pressure drop per metre along the longitudinal axis of the reactor after injection of additive

| $\Delta G_1$ | [mbar/m] | 58 |
| $\Delta G_2$ | [mbar/m] | 56 |
| $\Delta G_3$ | [mbar/m] | 54 |

The differences between the successive pressure drops per meter referred to the mean of the two values, are recalculated:

$(\Delta G_1 - \Delta G_2)/(\Delta G_1 + \Delta G_2)*2 = 4\%$ $(\Delta G_2 - \Delta G_3)/(\Delta G_2 + \Delta G_3)*2 = 4\%$ The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for synthesizing hydrocarbons starting from a feedstock containing synthesis gas, comprising:

reacting said feedstock in a three-phase reaction section in which solid Fischer-Tropsch catalyst particles are maintained in suspension in a liquid phase by circulation of a gaseous phase from the bottom to the top of said reaction section, the catalyst suspension in the liquid phase forming a slurry, wherein the following stages are carried to control and maintain homogeneity of the concentration of said solid Fischer-Tropsch catalyst particles in said reaction section:

(a) measuring the differential pressures $\Delta P_i$ between two consecutive pressure measuring points spaced apart by $\Delta h_i$ and calculating the pressure drops per meter $\Delta G_i = \Delta P_i/\Delta h_i$ for all i between 1 and n-1, wherein i is a natural number between 1 and n-1 and n represents the number of pressure measuring points disposed along the longitudinal axis of the reactor and being at least equal to 3 wherein measurement point 1 is the lowest measurement point and measurement point n is the highest measurement point in said reaction section, (b) calculating a value corresponding to the difference between two consecutive pressure drops per meter divided by their mean $(\Delta G_{i+1} - \Delta G_i)/((\Delta G_{i+1} + \Delta G_i)/2)$, for each pressure drop per meter $\Delta G_i$ in the catalyst suspension in the liquid phase, (c) injecting at least one additive comprising at least one organosilicon polymer at least at the bottom of said reaction section when at least one of the values calculated in the stage (b) is greater than or equal to 5%.

2. The process according to claim 1, wherein stages (a) to (c) are repeated.

3. The process according to claim 1, wherein said additive is injected mixed with a solvent chosen from the products of the Fischer-Tropsch synthesis.

4. The process according to claim 1, wherein said additive is injected at branch lines of the differential pressure sensors.

5. The process according to claim 1, wherein said slurry is recirculated to the reactor section via a recirculation line and said additive is injected into said recirculation line.

6. The process according to claim 1, wherein said additive is injected in the form of a batch-wise injection.

7. The process according to claim 1, wherein said additive is injected in the form of a continuous injection.

8. The process according to claim 1, wherein in stage (c) said at least one additive containing at least one organosilicon polymer is injected when at least one of the values calculated during the stage (b) is greater than or equal to 10%.

9. The process according to claim 1, wherein in stage (c) said at least one additive containing at least one organosilicon polymer is injected when at least one of the values calculated during the stage (b) is greater than or equal to 20%.

10. The process according to claim 1, wherein the distance between two consecutive measurement points, $\Delta h_i$, is between 0.5 and 5 m.

11. The process according to claim 1, wherein the distance between two consecutive measurement points, $\Delta h_i$, is between 1 and 3 m.

12. The process according to claim 1, wherein at least three pressure measurement points are situated in said liquid phase.

13. The process according to claim 1, wherein said at least one organosilicon polymer is a silicone.

14. The process according to claim 1, wherein said at least one organosilicon polymer is a siloxane polymer.

15. The process according to claim 1, wherein said at least one organosilicon polymer is a polydimethylsiloxane.

16. The process according to claim 1, wherein said solid Fischer-Tropsch catalyst particles have a diameter between 5 and 500 μm.

* * * * *